US012790138B2

(12) United States Patent
Li et al.

(10) Patent No.: US 12,790,138 B2
(45) Date of Patent: Nov. 10, 2026

(54) PNEUMATIC CONVEYING SYSTEM AND CONTROL METHOD

(71) Applicants: JIANGSU XCMG CONSTRUCTION MACHINERY RESEARCH INSTITUTE LTD., Jiangsu (CN); JIANGSU XCMG STATE KEY LABORATORY TECHNOLOGY CO., LTD., Jiangsu (CN)

(72) Inventors: Yang Li, Jiangsu (CN); Haiqiang Li, Jiangsu (CN); Jianting Liu, Jiangsu (CN)

(73) Assignees: JIANGSU XCMG CONSTRUCTION MACHINERY RESEARCH INSTITUTE LTD, Xuzhou (CN); JIANGSU XCMG STATE KEY LABORATORY TECHNOLOGY CO., LTD., Xuzhou (CN)

( * ) Notice: Subject to any disclaimer, the term of this patent is extended or adjusted under 35 U.S.C. 154(b) by 132 days.

(21) Appl. No.: 18/862,009

(22) PCT Filed: Oct. 11, 2023

(86) PCT No.: PCT/CN2023/123888
§ 371 (c)(1),
(2) Date: Oct. 31, 2024

(87) PCT Pub. No.: WO2024/109367
PCT Pub. Date: May 30, 2024

(65) Prior Publication Data

US 2025/0162822 A1 May 22, 2025

(30) Foreign Application Priority Data

Nov. 25, 2022 (CN) ........................ 202211487858.6

(51) Int. Cl.
*B65G 53/52* (2006.01)
*B65G 43/02* (2006.01)
(Continued)

(52) U.S. Cl.
CPC ............. *B65G 53/52* (2013.01); *B65G 43/02* (2013.01); *B65G 43/08* (2013.01); *B65G 53/24* (2013.01); *B65G 53/46* (2013.01); *B65G 53/50* (2013.01)

(58) Field of Classification Search
CPC ............................... B65G 53/66; B65G 53/50; B65G 2812/1616; B65G 53/52; B65G 53/12;
(Continued)

(56) References Cited

U.S. PATENT DOCUMENTS 11,310,955 B2 4/2022 Ruppert et al.

FOREIGN PATENT DOCUMENTS

CN 102491093 B 3/2014
CN 104229497 B 8/2016
(Continued)

OTHER PUBLICATIONS

International Search Report and Written Opinion mailed Jan. 15, 2024 in International Patent Application No. PCT/CN2023/123888.

*Primary Examiner* — Gene O Crawford
*Assistant Examiner* — Amari J Meddling
(74) *Attorney, Agent, or Firm* — Venable LLP

(57) ABSTRACT

A pneumatic conveying system and a control method therefor. The system comprises a power unit (1), a fan unit (2), a valve unit (3), a sensor unit (4), a pneumatic conveying unit (5), a pipeline arrangement net (6) and a control system (7), wherein the he fan unit (2), the valve unit (3), the sensor unit (4) and the pneumatic conveying unit (5) are connected together in an ordered manner by means of the pipeline arrangement net (6) to form a whole.

16 Claims, 6 Drawing Sheets

(51) Int. Cl.
*B65G 43/08* (2006.01)
*B65G 53/24* (2006.01)
*B65G 53/46* (2006.01)
*B65G 53/50* (2006.01)

(58) Field of Classification Search
CPC .............. B65G 53/24; B65G 2201/042; B65G 53/4691; B65G 53/58; B65G 2812/1641; B65G 2812/1625; A01C 7/082; F17D 1/04
See application file for complete search history.

(56) References Cited

FOREIGN PATENT DOCUMENTS

| | | | | | |
|---|---|---|---|---|---|
| CN | 106986188 | A | * | 7/2017 | ............. B65G 51/36 |
| CN | 210480204 | U | | 5/2020 | |
| CN | 115724209 | A | | 3/2023 | |
| DE | 102007063105 | A1 | | 7/2009 | |
| WO | 2023072585 | A1 | | 5/2023 | |

* cited by examiner

PNEUMATIC CONVEYING SYSTEM AND CONTROL METHOD

CROSS-REFERENCE TO RELATED APPLICATIONS

The present application is a U.S. National Stage Application under 35 U.S.C. § 371 of International Patent Application No. PCT/CN2023/123888, filed on Oct. 11, 2023, which is based on and claims priority to China Patent Application No. 202211487858.6 filed on Nov. 25, 2022, the disclosure both of which are incorporated by reference herein in their entirety.

TECHNICAL FIELD

The present disclosure relates to a pneumatic conveying system and a control method, and belongs to the technical field of pneumatic conveying.

BACKGROUND

Pneumatic conveying is an important means to transport powder and block materials, and bulk materials may be transported from one or more sources to one or more destinations by using airflow as a conveying medium. According to the operation principles, Pneumatic conveying may be divided into two types: suction-type pneumatic conveying to suck air and material together into a pipeline together and transport the same by using airflow with a low atmospheric pressure, also referred to as vacuum suction conveying; compression-type pneumatic conveying to push and convey the material by using compressed air higher than atmospheric pressure. The pneumatic conveying device which is simply composed, has the characteristics of high safety, low cost and convenient maintenance, and is widely applied in industries such as agriculture, food, energy, chemical engineering and environmental hygiene.

Since air source is a key core of the pneumatic conveying system and a top priority to be considered in designing the pneumatic conveying system, it is necessary to select different air source devices (commonly seen in Roots blower and centrifugal fan) by comprehensively taking into account the material characteristics, and the requirements for the resistance and conveying rate of the conveying system. Usually, when the design of the pneumatic conveying system is completed, the air source device is fixed immediately, which makes it impossible to significantly adjust the conveying distance and conveying rate of the system. However, flexible requirements for the pneumatic conveying system are set forth by some users, that is, it is possible to rapidly and significantly adjust the blast volume and blast pressure of the air source, and switch the suction/pressure modes to adapt to different operation conditions.

SUMMARY

In one aspect, a pneumatic conveying system, comprising: a power unit, a fan unit, a valve unit, a pneumatic conveying unit and a pipeline arrangement network.

The power unit comprises a first power system and a second power system, configured to provide power to the fan unit.

The fan unit comprises a first fan and a second fan.

The valve unit comprises a first control valve, a second control valve, a third control valve, a fourth control valve, a fifth control valve, a sixth control valve, a seventh control valve, an eighth control valve and a ninth control valve.

The pneumatic conveying unit comprises a suction-type pneumatic conveying unit and a compression-type pneumatic conveying unit.

The pipeline arrangement network comprises a first pipeline, a first bypass pipeline, a second pipeline, a second bypass pipeline, a third pipeline, a third bypass pipeline, a fourth pipeline, a fourth bypass pipeline and a first connection pipeline.

A return air inlet of the first fan is connected with the first pipeline, and the first pipeline is connected with the fifth control valve; the first pipeline at a front end of the fifth control valve is connected with the first bypass pipeline, the first bypass pipeline is connected with the seventh control valve; an air outlet of the first fan is connected with the second pipeline, and an extremity of the second pipeline is connected with the compression-type pneumatic conveying unit; the second pipeline is connected with the eighth control valve, the second pipeline at a front end of the eighth control valve is connected with the second bypass pipeline, and the second bypass pipeline is connected with the ninth control valve.

A return air inlet of the second fan is connected with the third pipeline, and an extremity of the third pipeline is connected with the suction-type pneumatic conveying unit; the third pipeline is connected with the first control valve, the third pipeline at a front end of the first control valve is connected with the third bypass pipeline, and the third bypass pipeline is connected with the second control valve; an air outlet of the second fan is connected with the fourth pipeline, the fourth pipeline is connected with the fourth control valve, the fourth pipeline at a front end of the fourth control valve is connected with the fourth bypass pipeline, and the fourth bypass pipeline is connected with a third control valve.

An extremity of the first pipeline is connected with the third pipeline at a rear end of the first control valve to be in conduction with the suction-type pneumatic conveying unit; an extremity of the fourth pipeline is connected with the second pipeline at a rear end of the eighth control valve to be connected with the compression-type pneumatic conveying unit.

The first pipeline between a front end of the fifth control valve and the first bypass pipeline is connected with one end of the first connection pipeline; the fourth pipeline between a front end of the fourth control valve and the fourth bypass pipeline is connected with the other end of the first connection pipeline, and the first connection pipeline is provided with a sixth control valve.

In some embodiments, there further comprises: a sensor unit which comprises a first flow sensor, a first pressure sensor, a second flow sensor, a second pressure sensor, a first rotation speed sensor, a first temperature sensor, a third pressure sensor, a third flow sensor, a fourth flow sensor, a fourth pressure sensor, a second rotation speed sensor, a second temperature sensor, a fifth pressure sensor, a fifth flow sensor, a sixth pressure sensor and a sixth flow sensor.

The third pipeline at a front end of the suction-type pneumatic conveying unit is provided with the first flow sensor and the first pressure sensor; the third pipeline at a front end of the return air inlet of the second fan are provided with the second flow sensor and the second pressure sensor; the second power system is provided with the first speed sensor; the second fan is provided with the first temperature sensor, and the fourth pipeline at a front end of the air outlet of the second fan is provided with the third pressure sensor and the third flow sensor.

The first pipeline at a front end of the return air inlet of the first fan are provided with the fourth flow sensor and the fourth pressure sensor; the first power system is provided with the second speed sensor; the first fan is provided with the second temperature sensor; the second pipeline at a front end of the air outlet of the first fan are provided with the fifth pressure sensor and the fifth flow sensor; the second pipeline at a front end of the compression-type pneumatic conveying unit are provided with the sixth pressure sensor and the sixth flow sensor.

In some embodiments, there further comprises: a control system, wherein the control system automatically or manually implements the control method of the present system according to the data measured by the sensor unit.

In a second aspect, a control method of a pneumatic conveying system is provided. The method comprises:

Causing the pneumatic conveying system to enter into a first operation mode, to make a first fan performs negative pressure suction-type pneumatic conveying as a single fan; monitoring test data of a fourth flow sensor, a fourth pressure sensor and a second temperature sensor throughout the operation process; sending an alarm in a case where the test data of at least one of the fourth flow sensor, the fourth pressure sensor or the second temperature sensor exceeds a corresponding limit value, and automatically entering into a system protection program at the same time, and turning off a power system and a control valve sequentially.

Switching to a fourth operation mode to make the first fan and a second fan connected in parallel perform negative pressure suction-type pneumatic conveying in a case where a flow rate value measured by a first flow sensor still does not satisfy the requirements at a maximum rotation speed of the first fan.

Switching to a third operation mode to make the first fan and the second fan connected in series perform negative pressure suction-type pneumatic conveying in a case where a pressure value measured by a first pressure sensor still does not satisfy the requirements at a maximum rotation speed of the first fan.

In some embodiments, there further comprises:

Causing the pneumatic conveying system to enter into a second operation mode to make the second fan performs negative pressure suction-type pneumatic conveying as a single fan; monitoring test data of a second flow sensor, a second pressure sensor and a first temperature sensor throughout the operation process; sending an alarm, automatically entering into the system protection program at the same time, and turning off the power system and the control valve sequentially in a case where the test data of at least one of the second flow sensor, the second pressure sensor or the first temperature sensor exceeds a corresponding limit value.

Switching to the fourth operation mode to make the first fan and the second fan connected in parallel perform negative pressure suction-type pneumatic conveying in a case where the flow rate value measured by the first flow sensor still does not satisfy the requirements at a maximum rotation speed of the second fan.

Switching to the third operation mode to make the first fan and the second fan connected in series perform negative pressure suction-type pneumatic conveying in a case where the pressure value measured by the first pressure sensor still does not satisfy the requirements at a maximum rotation speed of the second fan.

In some embodiments, the specific steps of the first operation mode are as follows:

Turning on a fifth control valve and a ninth control valve, and maintaining a first control valve, a second control valve, a third control valve, a fourth control valve, a sixth control valve, a seventh control valve and a eighth control valve in an OFF state; starting a first power system and adjusting operation parameters of the first power system to make the first fan reaches a specified rotation speed; reading the flow rate value measured by the first flow sensor and the pressure value measured by the first pressure sensor to be compared with a required data, and dynamically adjusting the operation parameters of the first power system according to a difference during operation.

In some embodiments, the specific steps of the second operation mode are as follows:

Turning on a first control valve and a third control valve, and maintaining a second control valve, a fourth control valve, a fifth control valve, a sixth control valve, a seventh control valve, an eighth control valve and a ninth control valve in an OFF state; starting a second power system and adjusting operation parameters of the second power system to make the second fan reaches a specified rotation speed; reading the flow rate value measured by the first flow sensor and the pressure value measured by the first pressure sensor to be compared with a required data, and dynamically adjusting the operation parameters of the second power system according to a difference during operation.

In some embodiments, the specific steps of the third operation mode are as follows:

Turning on the first control valve, the sixth control valve and the ninth control valve, and maintaining the second control valve, the third control valve, the fourth control valve, the fifth control valve, the seventh control valve and the eighth control valve in the OFF state; starting the first power system and a second power system and adjusting operation parameters of the first power system and the second power system to make the first fan and the second fan reach a specified rotation speed; reading the flow rate value measured by the first flow sensor and the pressure value measured by the first pressure sensor to be compared with the required data, and synchronously and dynamically adjusting the operation parameters of the first power system and the second power system according to a difference during operation.

Monitoring test data of a second flow sensor, a second pressure sensor, a first temperature sensor, the fourth flow sensor, the fourth pressure sensor and the second temperature sensor throughout the operation process, and sending the alarm, automatically entering into the system protection program at the same time, and turning off the power system and the control valve sequentially in a case where the test data of at least one of the second flow sensor, the second pressure sensor, the first temperature sensor, the fourth flow sensor, the fourth pressure sensor or the second temperature sensor exceeds a corresponding limit value.

In some embodiments, the specific steps of the fourth operation mode are as follows:

Turning on the first control valve, the third control valve, the fifth control valve and the ninth control valve, and maintaining the second control valve, the fourth control valve, the sixth control valve, the seventh control valve and the eighth control valve in the OFF state; starting the first power system and the second power system, and adjusting the operation parameters of the first power system and the second power system to make the first fan and the second fan reach a specified rotation speed; reading the flow rate value measured by the first flow sensor and the pressure value measured by the first pressure sensor to be compared with the required data, and synchronously and dynamically adjusting the operation parameters of the first power system and the second power system according to a difference during operation.

Monitoring the test data of the second flow sensor, the second pressure sensor, the first temperature sensor, the fourth flow sensor, the fourth pressure sensor and the second temperature sensor throughout the operation process, and sending the alarm, automatically entering into the system protection program at the same time, and turning off the power system and the control valve sequentially in a case where the test data of at least one of the second flow sensor, the second pressure sensor, the first temperature sensor, the fourth flow sensor, the fourth pressure sensor or the second temperature sensor exceeds a corresponding limit value.

In a third aspect, a control method of a pneumatic conveying system is provided. The method comprises:

Causing the pneumatic conveying system to enter into a fifth operation mode to make a first fan performs positive pressure compression-type pneumatic conveying as a single fan; monitoring a test data of a second temperature sensor, a fifth pressure sensor and a fifth flow sensor throughout an operation process, and sending an alarm, automatically entering into a system protection program at the same time, and turning off a power system and a control valve sequentially in a case where the test data of at least one of the second temperature sensor, the fifth pressure sensor or the fifth flow sensor exceeds a corresponding limit value.

Switching to an eighth operation mode to make the first fan and a second fan connected in parallel perform positive pressure compression-type pneumatic conveying in a case where a flow rate value measured by a sixth flow sensor still does not satisfy the requirements at a maximum rotation speed of the first fan.

Switching to a seventh operation mode to make the first fan and the second fan connected in series perform positive pressure compression-type pneumatic conveying in a case where a pressure value measured by a sixth pressure sensor still does not satisfy the requirements at a maximum rotation speed of the first fan.

In some embodiments, there further comprises:

causing the pneumatic conveying system to enter into a sixth operation mode to make the second fan performs positive pressure suction-type pneumatic conveying as a single fan; monitoring test data of a first temperature sensor, a third pressure sensor and a third flow sensor throughout the operation process; sending an alarm, automatically entering into a system protection program at the same time, and turning off a power system and a control valve sequentially in a case where the test data of at least one of the first temperature sensor, the third pressure sensor or the third flow sensor exceeds a corresponding limit value.

Switching to the eighth operation mode to make the first fan and the second fan connected in parallel perform positive pressure compression-type pneumatic conveying in a case where the flow rate value measured by the sixth flow sensor still does not satisfy the requirements at a maximum rotation speed of the second fan.

Switching to the seventh operation mode to make the first fan and the second fan connected in series perform positive pressure compression-type pneumatic conveying in a case where the pressure value measured by the sixth pressure sensor still does not satisfy the requirements at a maximum rotation speed of the second fan.

In some embodiments, the specific steps of the fifth operation mode are as follows:

Turning on a seventh control valve and an eighth control valve, and maintaining a first control valve, a second control valve, a third control valve, a fourth control valve, a fifth control valve, a sixth control valve and a ninth control valve in an OFF state; starting a first power system and adjusting operation parameters of the first power system to make the first fan reaches a specified rotation speed; reading the pressure value measured by the sixth pressure sensor and the flow rate value measured by the sixth flow sensor to be compared with the required data, and dynamically adjusting the operation parameters of the first power system according to a difference during operation.

In some embodiments, the specific steps of the sixth operation mode are as follows:

Turning on a second control valve and a fourth control valve, and maintaining the first control valve, the third control valve, the fifth control valve, the sixth control valve, the seventh control valve, the eighth control valve and the ninth control valve in the OFF state; starting a second power system and adjusting operation parameters of the second power system to make the second fan reaches a specified rotation speed; reading the pressure value measured by the sixth pressure sensor and the flow rate value measured by the sixth flow sensor to be compared with the required data, and dynamically adjusting the operation parameters of the second power system according to a difference during operation.

In some embodiments, the specific steps of the seventh operation mode are as follows:

Turning on a second control valve, a sixth control valve and an eighth control valve, and maintaining a first control valve, a third control valve, a fourth control valve, a fifth control valve, a seventh control valve and a ninth control valve in an OFF state; starting a first power system and a second power system, and adjust operation parameters of the first power system and the second power system to make the first fan and the second fan reach a specified rotation speed; reading the pressure value measured by the sixth pressure sensor and the flow rate value measured by the sixth flow sensor to be compared with the required data, and synchronously and dynamically adjusting the operation parameters of the first power system and the second power system according to a difference during operation.

Monitoring test data of a first temperature sensor, a third pressure sensor, a third flow sensor, the second temperature sensor, the fifth pressure sensor and the fifth flow sensor throughout the operation process, and sending an alarm, automatically entering into a system protection program at the same time, and turning off a power system and a control valve sequentially in a case where the test data of at least one of the first temperature sensor, the third pressure sensor, the third flow sensor, the second temperature sensor, the fifth pressure sensor or the fifth flow sensor exceeds a corresponding limit value.

In some embodiments, the specific steps of the eighth operation mode are as follows:

Turning on the second control valve, the fourth control valve, the seventh control valve and the eighth control valve, and maintaining the first control valve, the third control valve, the fifth control valve, the sixth control valve and the ninth control valve in the OFF state; starting the first power system and the second power system, and adjusting operation parameters of the first power system and the second power system to make the first fan and the second fan reach the specified rotation speed; reading the pressure value measured by the sixth pressure sensor and the flow rate value measured by the sixth flow sensor to be compared with the required data, and synchronously and dynamically adjusting the operation parameters of the first power system and the second power system according to a difference during operation.

Monitoring the test data of the first temperature sensor, the third pressure sensor, the third flow sensor, the second temperature sensor, the fifth pressure sensor and the fifth flow sensor throughout the operation process, and sending the alarm, automatically entering into the system protection program at the same time, and turning off the power system and the control valve sequentially in a case where the test data of at least one of the first temperature sensor, the third pressure sensor, the third flow sensor, the second temperature sensor, the fifth pressure sensor or the fifth flow sensor exceeds a corresponding limit value.

In some embodiments, a control system is provided. The system comprises: a memory; and a processor coupled to the memory, wherein the processor is configured to perform the control method described above based on instructions stored in the memory.

In some embodiments, a computer-readable storage medium is provided. The medium has computer program instructions stored thereon that, when executed by a processor, perform the control method described above.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings which constitute a part of this specification, illustrate the embodiments of the present disclosure, and together with this specification, serve to explain the principles of the present disclosure.

The present disclosure may be more explicitly understood from the following detailed description with reference to the accompanying drawings, in which.

REFERENCE NUMERALS

Figure 1:
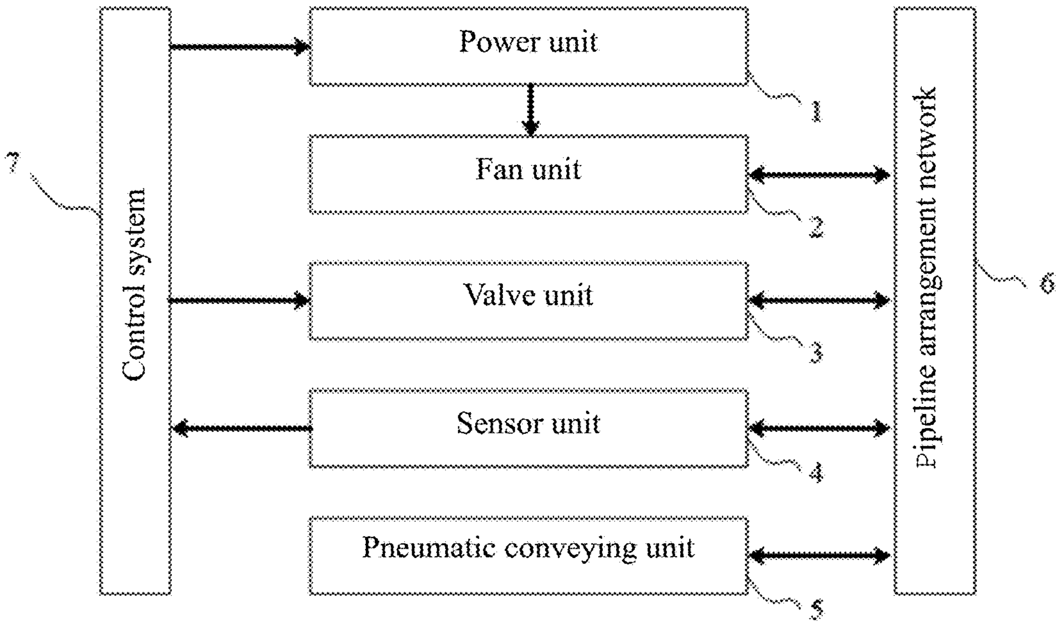
FIG. 1 is a composition diagram of the pneumatic conveying system according to some embodiments of the present disclosure.

1—power unit, 101—first power system, 102—second power system, 2—fan unit, 201—first fan, 202—second fan, 3—valve unit, 301—first control valve, 302—second control valve, 303—third control valve, 304—fourth control valve, 305—fifth control valve, 306—sixth control valve, 307—seventh control valve, 308—eighth control valve, 309—ninth control valve, 4—sensor unit, 401—first flow sensor, 402—first pressure sensor, 403—second flow sensor, 404—second pressure sensor, 405—first rotation speed sensor, 406—first temperature sensor, 407—third pressure sensor, 408—third flow sensor, 409—fourth flow sensor, 410—fourth pressure sensor, 411—second rotation speed sensor, 412—second temperature sensor, 413—fifth pressure sensor, 414—fifth flow sensor, 415—sixth pressure sensor, 416—sixth flow sensor, 5—pneumatic conveying unit, 501—suction-type pneumatic conveying unit, 502—compression-type pneumatic conveying unit, 6—pipeline arrangement network, 7—control system.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

Since the conveying mode is fixed in the related art, it is impossible to adjust and switch the conveying mode. At the same time, as the air source involved in the related art is fixed and unique and the system has a poor flexibility, it is impossible to adjust the conveying distance and conveying rate significantly.

The present disclosure provides a pneumatic conveying system and a control method, which is able to implement rapidly switching a single-fan suction/pressure mode, a multi-fans series/parallel connection mode and a multi-fans suction/pressure mode by controlling the ON/OFF states of different valves, to adapt to the requirements of multiple operation conditions. At the same time, by way of the embodiments of the present disclosure, it is possible for multiple fans to take turns in operation/maintenance in a non-stop state and prolong the service life of the fans. Compared with the related art, it at least comprises at least one of the following advantages:

(1) The embodiments of the present disclosure is able to make it possible for different fans to take turns in operation/maintenance and prolong the service life of the fans when the pneumatic conveying system has a single fan in operation;

(2) The embodiments of the present disclosure is able to implement freely switching the series and parallel operation modes of the fans, which provides a higher air pressure and flow for the pneumatic conveying system and realize pneumatic conveying at a longer distance and with a higher efficiency, to satisfy the operational requirements of multiple operation conditions;

(3) The embodiments of the present disclosure is able to implement freely switching positive and negative pressures of the pneumatic conveying system, which satisfies both positive pressure compression-type pneumatic conveying conditions and negative pressure suction-type pneumatic conveying conditions;

(4) The embodiments of the present disclosure is able to realize self-adaptive control of the blast volume and blast pressure of the pneumatic conveying system, automatically match the positive and negative pressures and the series and parallel operation modes of the fans and the operation parameters of the power system according to the blast volume and blast pressure value required by the user, and at the same time, the system is able to perform dynamic adjustment according to the air flow rate and pressure value at the output end, to maintain a stable air flow rate and pressure value at the output end and satisfy the requirements of the user.

The present disclosure will be further explained below in conjunction with specific embodiments.

Figure 2:
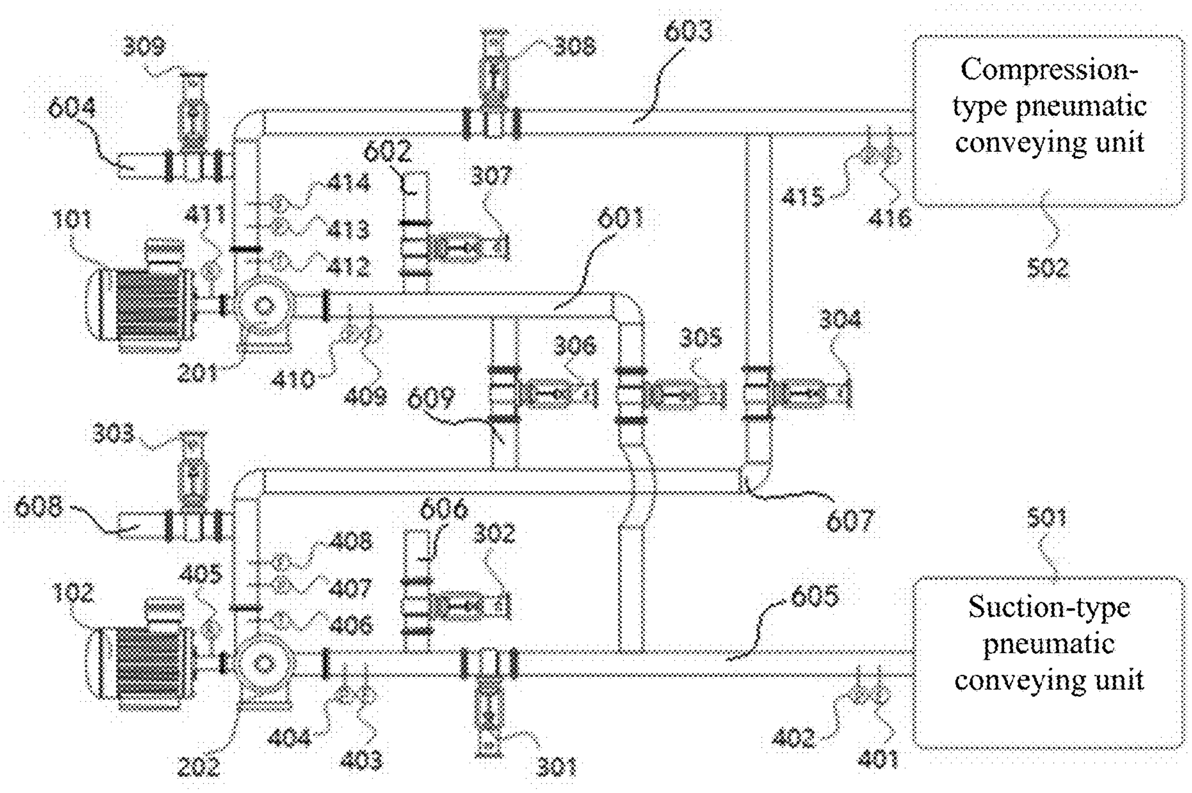
FIG. 2 is a schematic view of connecting main members of the pneumatic conveying system according to some embodiments of the present disclosure.

As shown in FIGS. 1 to 2, in some embodiments of the present disclosure, the pneumatic conveying system comprises a power unit 1, a fan unit 2, a valve unit 3, a sensor unit 4, a pneumatic conveying unit 5, a pipeline arrangement network 6 and a control system 7.

The power unit 1 consisting of a first power system 101 and a second power system 102 responsible for providing power to the fan unit 2 in the form of power devices such as an engine, a motor and an electric motor, convert chemical energy, kinetic energy and electric energy into kinetic energy to drive the fan to rotate, and are connected with the fan through a coupling, a belt and a chain, so that its rotation speed is adjusted according to actual needs.

The fan unit 2 consisting of a first fan 201 and a second fan 202, is a power source of air flow in the pneumatic conveying system, and responsible for converting kinetic energy provided by the power unit 1 into energy of air flow in the pneumatic conveying system, in the form comprising but not limited to a Roots blower, a centrifugal fan, an axial fan and the like.

The valve unit 3 consisting of a first control valve 301, a second control valve 302, a third control valve 303, a fourth control valve 304, a fifth control valve 305, a sixth control valve 306, a seventh control valve 307, an eighth control valve 308 and a ninth control valve 309 together, is able to implement shifting the positive and negative pressures and the series and parallel connection of the pneumatic conveying system by changing the ON/OFF state combinations of different valves, which solves the problem that the traditional pneumatic conveying system can only perform conveying in a single mode, and the blast volume and pressure value of the air does not be adjusted significantly.

The sensor unit 4 consisting of a first flow sensor 401, a first pressure sensor 402, a second flow sensor 403, a second pressure sensor 404, a first rotation speed sensor 405, a first temperature sensor 406, a third pressure sensor 407, a third flow sensor 408, a fourth flow sensor 409, a fourth pressure sensor 410, a second rotation speed sensor 411, a second temperature sensor 412, a fifth pressure sensor 413, a fifth flow sensor 414, a sixth pressure sensor 415 and a sixth flow sensor 416, functions to measure the parameters comprising flow rate, pressure, temperature and rotation speed at a specified position of the system, which provides basic data for the control system 7 to determine whether the blast volume and pressure of the system are consistent with the values set by the user and whether the fan is in an overloaded operation.

The pneumatic conveying unit 5 comprises a suction-type pneumatic conveying unit 501 and a compression-type pneumatic conveying unit 502, and one or both of the two pneumatic conveying units may be installed according to actual needs. The suction-type pneumatic conveying unit 501 is able to realize negative pressure suction-type pneumatic conveying by relying on the negative pressure air source provided by the pneumatic conveying system, and the compression-type pneumatic conveying unit 502 is able to realize positive pressure blow pneumatic conveying by relying on the positive pressure air source provided by the pneumatic conveying system.

The pipeline arrangement network 6 is responsible for providing space for air flow inside the pneumatic conveying system, and connecting the fan unit 2, the valve unit 3, the sensor unit 4 and the pneumatic conveying unit 5 together in sequence through the pipeline arrangement network 6, to form a whole.

A return air inlet of the first fan 201 is connected with a first pipeline 601, and the first pipeline 601 is connected with a fifth control valve 305; the first pipeline 601 at a front end of the fifth control valve 305 is connected with a first bypass pipeline 602, and the first bypass pipeline 602 is connected with a seventh control valve 307; an air outlet of the first fan 201 is connected with a second pipeline 603, wherein an extremity of the second pipeline 603 is connected with the compression-type pneumatic conveying unit 502. The second pipeline 603 is connected with an eighth control valve 308, and the second pipeline 603 at a front end of the eighth control valve 308 is connected with a second bypass pipeline 604, and the second bypass pipeline 604 is connected with a ninth control valve 309.

A return air inlet of the second fan 202 is connected with a third pipeline 605, wherein an extremity of the third pipeline 605 is connected with the suction-type pneumatic conveying unit 501. The third pipeline 605 is connected with the first control valve 301, wherein the third pipeline 605 at a front end of the first control valve 301 is connected with a third bypass pipeline 606, and the third bypass pipeline 606 is connected with a second control valve 302; an air outlet of the second fan 202 is connected with a fourth pipeline 607, and the fourth pipeline 607 is connected with a fourth control valve 304, wherein the fourth pipeline 607 at a front end of the fourth control valve 304 is connected with a fourth bypass pipeline 608, and the fourth bypass pipeline 608 is connected with the third control valve 303.

An extremity of the first pipeline 601 is connected with the third pipeline 605 at a rear end of the first control valve 301 to be in conduction with the suction-type pneumatic conveying unit 501; the extremity of the fourth pipeline 607 is connected with the second pipeline 603 at a rear end of the eighth control valve 308 to be in connection with the pneumatic conveying unit 502.

The first pipeline 601 between the front end of the fifth control valve 305 and the first bypass pipeline 602 is connected with one end of the first connection pipeline 609. The fourth pipeline 607 between the front end of the fourth control valve 304 and the fourth bypass pipeline 608 is connected with the other end of the first connection pipeline 609, and the first connection pipeline 609 is provided the sixth control valve 306.

The third pipeline 605 at a front end of the suction-type pneumatic conveying unit 501 is provided with the first flow sensor 401 and the first pressure sensor 402; the third pipeline 605 at a front end of the return air inlet of the second fan 202 is provided with the second flow sensor 403 and the second pressure sensor 404; the second power system 102 is provided with the first rotation speed sensor 405; the second fan 202 is provided with the first temperature sensor 406, and the fourth pipeline 607 at a front end of the air outlet of the second fan 202 is provided with the third pressure sensor 407 and the third flow sensor 408.

The first pipeline 601 at a front end of the return air inlet of the first fan 201 is provided with the fourth flow sensor 409 and the fourth pressure sensor 410; the first power system 101 is provided with the second speed sensor 411; the first fan 201 is provided with the second temperature sensor 412; the second pipeline 603 at a front end of the air outlet of the first fan 201 is provided with the fifth pressure sensor 413 and the fifth flow sensor 414; the second pipeline 603 at a front end of the pneumatic conveying unit 502 is provided with the sixth pressure sensor 415 and the sixth flow sensor 416.

Figure 3:
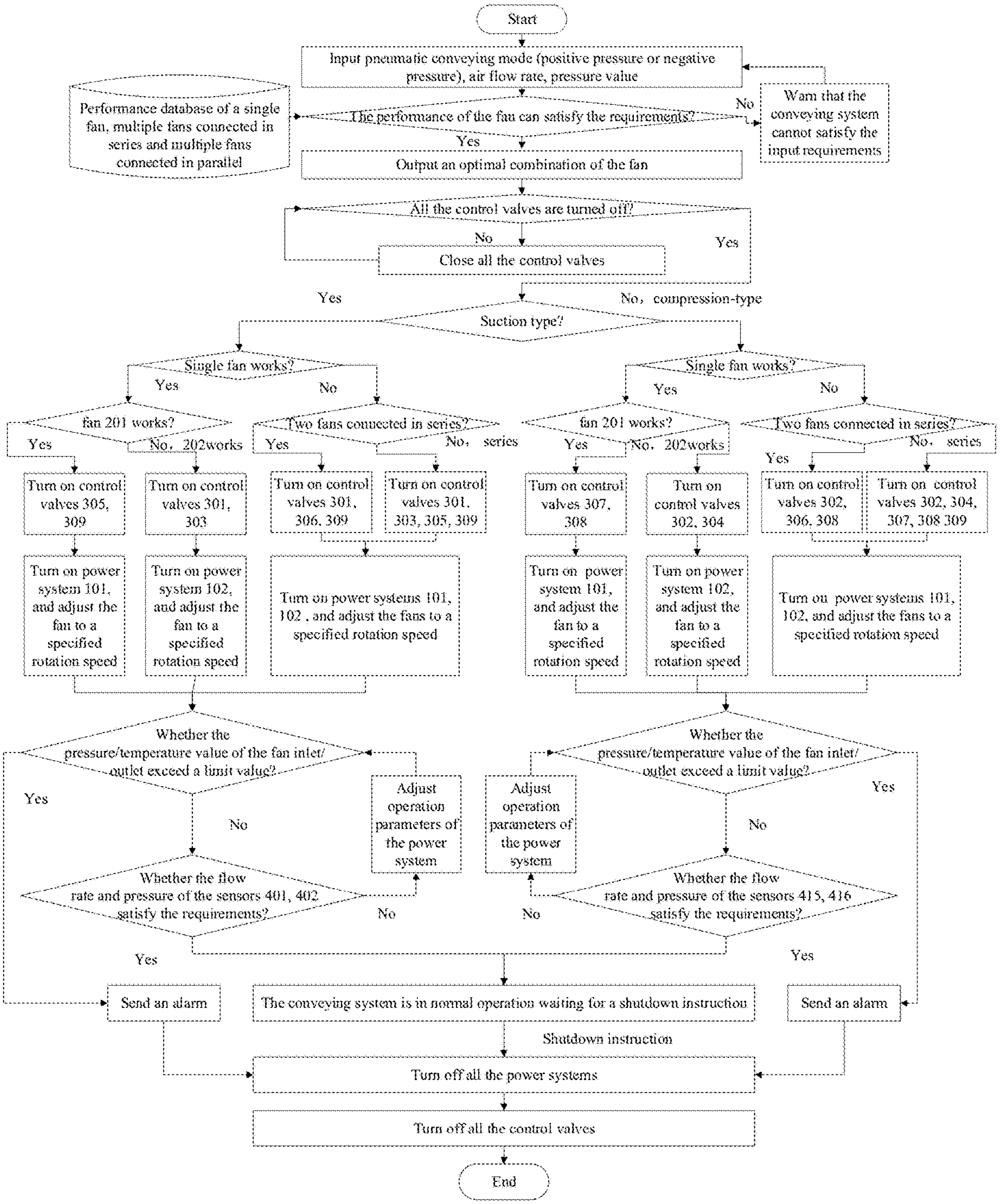
FIG. 3 is a flowchart of a control method of a pneumatic conveying system according to some embodiments of the present disclosure.

The control system 7 is responsible for receiving and processing the operation instructions and parameters input by the operator and the data measured by the sensor unit 4. The control system 7 is divided into two operation modes comprising manual operation and automatic operation to implement a control method of the present disclosure: in the manual operation mode, the control system 7 will control the ON/OFF states of a specified control valve according to the instruction input by the operator, and is able to also control the operation parameters of the power unit 1; the control flow of the automatic operation mode is shown in FIG. 3. The control system 7 will automatically calculate an optimal combination mode of the fan according to the parameters comprising the air flow rate and pressure input by the operator, then adjust the ON/OFF states of different valves in the valve unit 3 to a specified combination, and adjust the parameters of the power unit 1 to reach a specified rotation speed. After the pneumatic conveying system is in stable operation, the data of the air flow rate and pressure at the output measured by the sensor unit 4 is read and compared with the data input by the operator, to dynamically adjust the operation parameters of the power unit 1 according to a difference. In both modes, the control system 7 is able to monitor the pressure and temperature values at the inlet/outlet of the fan, and will send an alarm if a limit value is exceeded, and automatically enter into a protection program of the system.

In some embodiments, the control system inputs a pneumatic conveying mode, an air flow rate and a pressure value, wherein the pneumatic conveying mode comprises a positive pressure mode and a negative pressure mode. According to the performance database of a single fan, multiple fans connected in series and multiple fans connected in parallel, it is judged whether the performance of the fan satisfies the requirements. If the performance of the fan does not satisfy the requirements, it is alarmed that the conveying system does not satisfy the input requirements. If the performance of the fan satisfies the requirements, an optimal combination mode of the fan is output.

It is determined whether all the control valves are OFF, and if not all the control valves are turned OFF, all the control valves are turned off. If all the control valves are turned OFF, it is determined whether the fan performs suction-type pneumatic conveying.

If the fan performs suction-type pneumatic conveying, it is determined whether a single fan works. If a single fan works, it is determined whether fan 201 works. If fan 201 works, control valves 305 and 309 are turned on, power system 101 is started, and the fan is adjusted to a specified speed. If fan 201 does not work, it means that fan 202 works, control valves 301 and 303 are turned on, power system 102 is started, and the fan is adjusted to a specified speed. If it is not a single fan working, it is determined whether two fans are connected in series. If two fans are connected in series, control valves 301, 306 and 309 are turned on, power systems 101 and 102 are then started, and the fans are determined to a specified speed. If two fans are not connected in series, then two fans are connected in parallel, control valves 301, 303, 305 and 309 are turned on, and power systems 101 and 102 are then started, and the fans are adjusted to a specified speed.

After the fan is adjusted to a specified speed, it is determined whether the inlet pressure, outlet pressure and temperature value of the fan exceed a limit value. If a limit value is exceeded, an alarm will be sent. If a limit value is not exceeded, it is determined whether the flow rate value measured by sensor 401 and the pressure value measured by sensor 402 satisfy the requirements. If the requirements are satisfied, the conveying system is in normal operation waiting for a shutdown instruction. Otherwise, the operation parameters of the power system are adjusted.

If the fan does not perform suction-type pneumatic conveying, it means that pressure pneumatic conveying is performed. It is determined whether a single fan works. If a single fan works, it is determined whether fan 201 works. If fan 201 works, control valves 307 and 308 are turned on, power system 101 is started, and the fan is adjusted to a specified speed. If fan 201 does not work, it means that fan 202 works, control valves 302 and 304 are turned on, power system 102 is started, and the fan is adjusted to a specified speed. If it is not a single fan working, it is determined whether two fans are connected in series. If two fans are connected in series, control valves 302, 306 and 308 are turned on, and then power systems 101 and 102 are started, and the fans are adjusted to a specified speed. If two fans are not connected in series, then two fans are connected in parallel, control valves 302, 304, 307 and 308 are turned on, and then power systems 101 and 102 are started, and the fans are adjusted to a specified speed.

After the fan is adjusted to a specified speed, it is determined whether the inlet pressure, outlet pressure and temperature value of the fan exceed a limit value. If a limit value is exceeded, an alarm will be sent. If a limit value is not exceeded, it is determined whether the pressure value measured by sensor 415 and the flow rate value measured by sensor 416 satisfy the requirements. If the requirements are satisfied, the conveying system is in normal operation waiting for a shutdown instruction. Otherwise, the operation parameters of the power system are adjusted.

After a shutdown instruction is received, all the power systems are powered off, and all the control valves are turned off.

According to a second embodiment of the present disclosure, the control method of a pneumatic conveying system comprises the following steps:

The specific methods for switching between the operation modes of series and parallel connection, positive and negative pressures and taking turns in operation as a single fan are as follows:

In the first operation mode, the first fan 201 performs negative pressure suction-type pneumatic conveying as a single fan.

Figure 4:
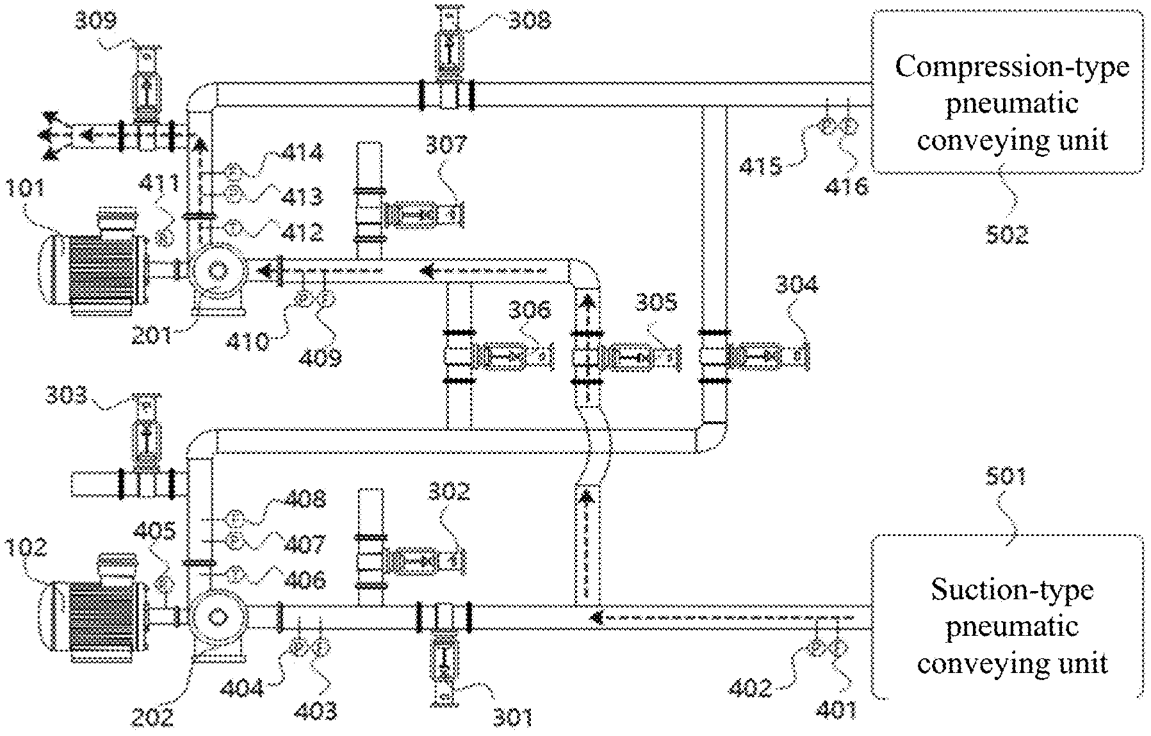
FIG. 4 is a schematic diagram of negative pressure suction-type pneumatic conveying with the first fan as a single fan according to some embodiments of the present disclosure.

The principles of such operation mode are shown in FIG. 4. During operation, first of all, the fifth control valve 305 and the ninth control valve 309 are turned on, and the first control valve 301, the second control valve 302, the third control valve 303, the fourth control valve 304, the sixth control valve 306, the seventh control valve 307 and the eighth control valve 308 are maintained in an OFF state. Then, the first power system 101 is turned on, and operation parameters of the first power system 101 are adjusted to make the first fan 201 reach a specified speed. The flow rate data measured by the first flow sensor 401 and the pressure data measured by the first pressure sensor 402 are read and compared with the required data, and the operation parameters of the first power system 101 are dynamically adjusted according to a difference. If the flow rate value measured by the first flow sensor 401 still does not satisfy the requirements at a maximum rotation speed of the first fan 201, it is switched to the fourth operation mode; if the pressure value measured by the first pressure sensor 402 at a maximum rotation speed of the first fan 201 still does not satisfy the requirements, it is switched to the third operation mode. Throughout the operation, the test data of the fourth flow sensor 409, the fourth pressure sensor 410 and the second temperature sensor 412 are monitored. If a limit value is exceeded, an alarm will be sent, and at the same time, the system will automatically enter into a protection program, and the power system and the control valves will be off sequentially.

In the second operation mode, the second fan 202 performs negative pressure suction-type pneumatic conveying as a single fan.

Figure 5:
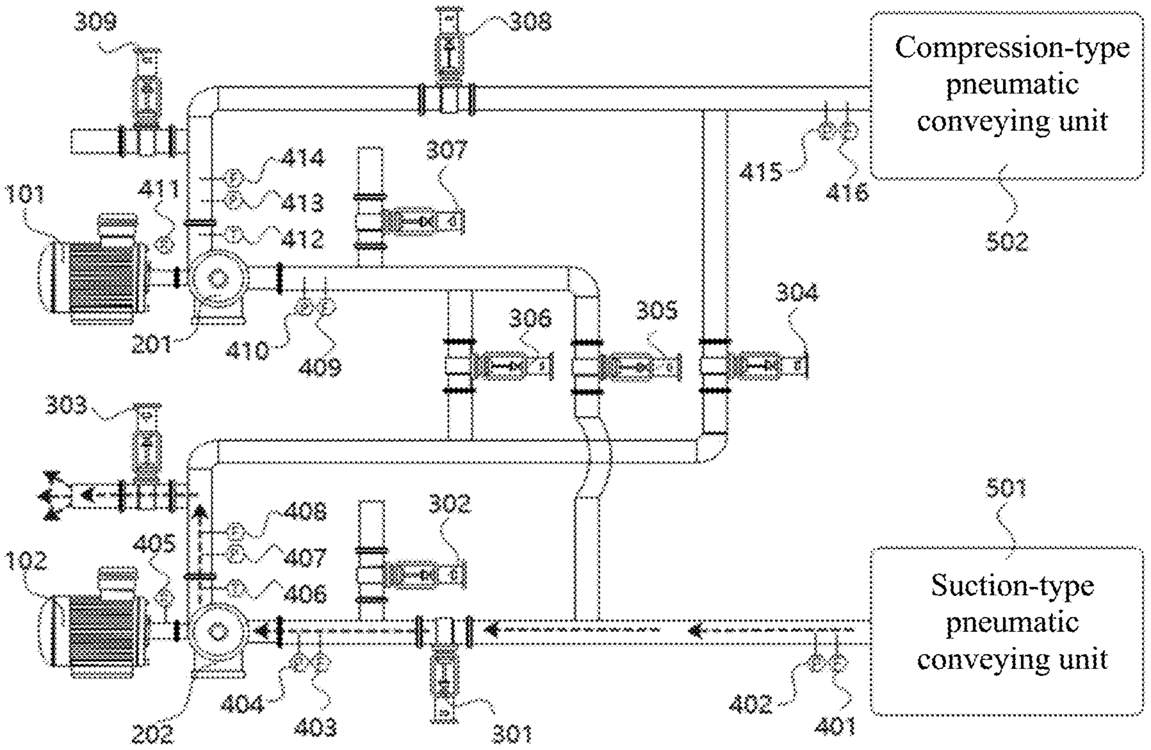
FIG. 5 is a schematic diagram of negative pressure suction-type pneumatic conveying with the second fan as a single fan according to some embodiments of the present disclosure.

The principles of such operation mode are shown in FIG. 5. During operation, first of all, the first control valve 301 and the third control valve 303 are turned on, and the second control valve 302, the fourth control valve 304, the fifth control valve 305, the sixth control valve 306, the seventh control valve 307, the eighth control valve 308 and the ninth control valve 309 are maintained in an OFF state. Then, the second power system 102 is turned on, and operation parameters of the second power system 102 are adjusted to make the second fan 202 reach a specified speed. The flow rate data measured by the first flow sensor 401 and the pressure data measured by the first pressure sensor 402 are read and compared with the required data, and the operation parameters of the second power system 102 are dynamically adjusted according to a difference. If the flow rate value measured by the first flow sensor 401 still does not satisfy the requirements at a maximum rotation speed of the second fan 202, it is switched to the fourth operation mode; if the pressure value measured by the first pressure sensor 402 at a maximum rotation speed of the second fan 202 still does not satisfy the requirements, it is switched to the third operation mode. Throughout the operation, the test data of the second flow sensor 403, the second pressure sensor 404 and the first temperature sensor 406 are monitored. If a limit value is exceeded, an alarm will be sent, and at the same time, the system will automatically enter into a protection program, and the power system and the control valves will be off sequentially. The first operation mode cooperates with the second operation mode, so that it is possible for two fans to take turns in operation/maintenance during negative pressure suction-type pneumatic conveying with a single fan and prolong the service life of the fan.

In the third operation mode, the first fan 201 and the second fan 202 are connected in series and perform negative pressure suction-type pneumatic conveying.

Figure 6:
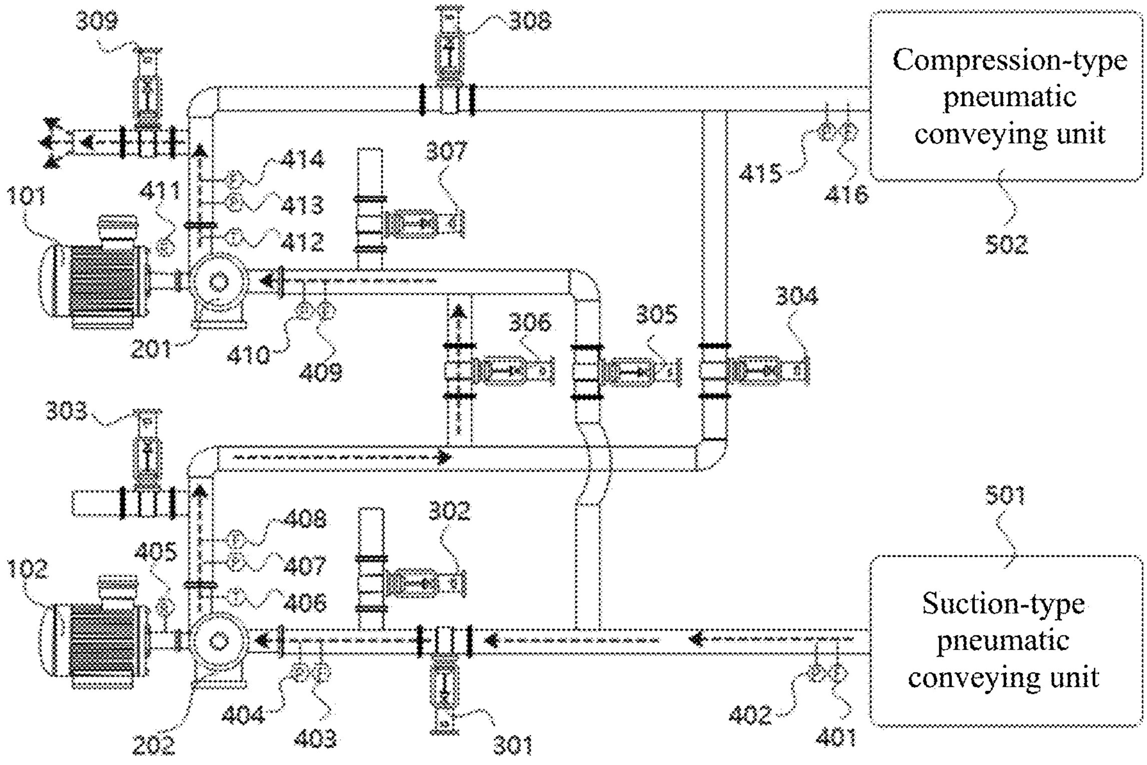
FIG. 6 is a schematic diagram of negative pressure suction-type pneumatic conveying with the first and second fans connected in series according to some embodiments of the present disclosure.

The principles of such operation mode are shown in FIG. 6. During operation, first of all, the first control valve 301, the sixth control valve 306 and the ninth control valve 309 are turned on, and the second control valve 302, the third control valve 303, the fourth control valve 304, the fifth control valve 305, the seventh control valve 307 and the eighth control valve 308 are maintained in an OFF state.

Then, the first power system 101 and the second power system 102 are turned on, and operation parameters of the first power system 101 and the second power system 102 are adjusted to make the first fan 201 and the second fan 202 reach a specified speed (it is to be noted that: the models and rotation speeds of the two fans are required to keep consistent when connected in series and parallel). The flow rate data measured by the first flow sensor 401 and the pressure data measured by the first pressure sensor 402 are read and compared with the required data, and the operation parameters of the first power system 101 and the second power system 102 are synchronously dynamically adjusted according to a difference. Throughout the operation, the test data of the second flow sensor 403, the second pressure sensor 404, the first temperature sensor 406, the fourth flow sensor 409, the fourth pressure sensor 410 and the second temperature sensor 412 are monitored. If a limit value is exceeded, an alarm will be sent, and at the same time, the system will automatically enter into a protection program, and the power system and the control valves will be off sequentially. Compared with the first operation mode and the second operation mode, such operation mode is able to provide a greater negative pressure for the suction-type pneumatic conveying unit 501 and realize pneumatic conveying at a farther distance.

In the fourth operation mode, the first fan 201 and the second fan 202 are connected in parallel and perform negative pressure suction-type pneumatic conveying.

Figure 7:
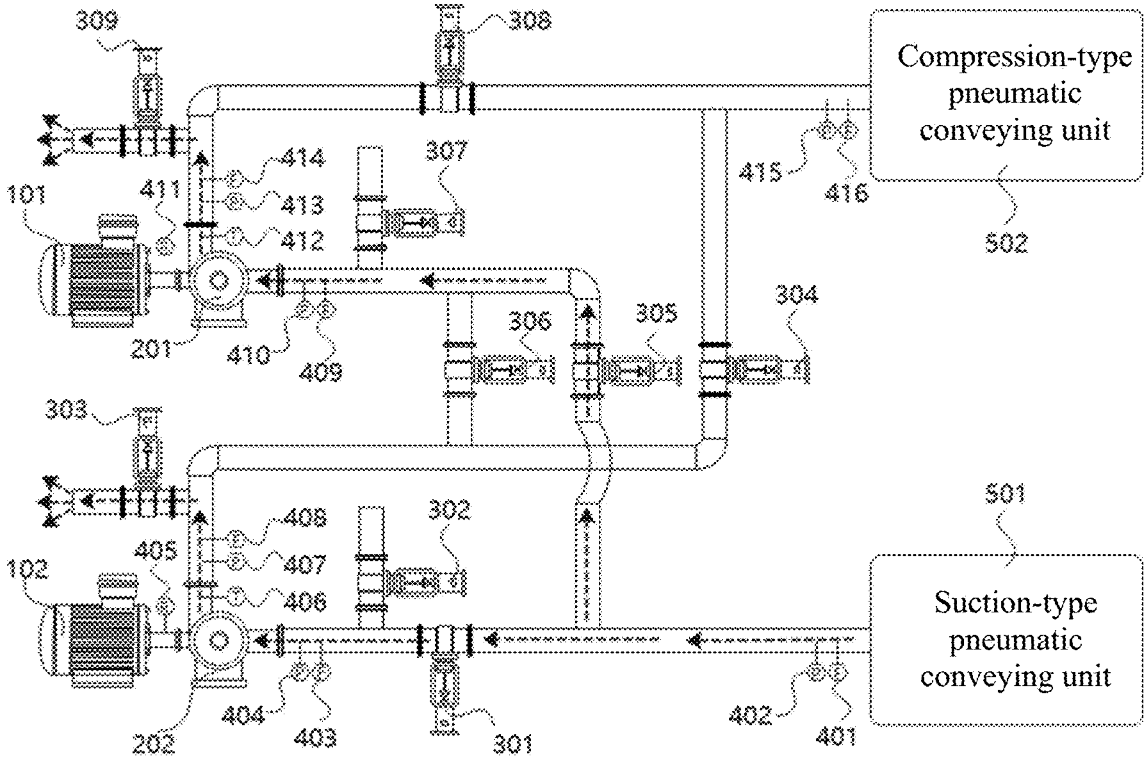
FIG. 7 is a schematic diagram of negative pressure suction-type pneumatic conveying with the first and second fans connected in parallel according to some embodiments of the present disclosure.

The principles of such operation mode are shown in FIG. 7. During operation, first of all, the first control valve 301, the third control valve 303, the fifth control valve 305 and the ninth control valve 309 are turned on, and the second control valve 302, the fourth control valve 304, the sixth control valve 306, the seventh control valve 307 and the eighth control valve 308 are maintained in an OFF state. Then, the first power system 101 and the second power system 102 are turned on, and operation parameters of the first power system 101 and the second power system 102 are adjusted to make the first fan 201 and the second fan 202 reach a specified speed. The flow rate data measured by the first flow sensor 401 and the pressure data measured by the first pressure sensor 402 are read and compared with the required data, and the operation parameters of the first power system 101 and the second power system 102 are synchronously dynamically adjusted according to a difference. Throughout the operation, the test data of the second flow sensor 403, the second pressure sensor 404, the first temperature sensor 406, the fourth flow sensor 409, the fourth pressure sensor 410 and the second temperature sensor 412 are monitored. If a limit value is exceeded, an alarm will be sent, and at the same time, the system will automatically enter into a protection program, and the power system and the control valves will be off sequentially. Compared with the first operation mode and the second operation mode, such operation mode is able to provide a greater pneumatic flow rate for the suction-type pneumatic conveying unit 501 and improve the pneumatic conveying efficiency.

In the fifth operation mode, the first fan 201 performs positive pressure compression-type pneumatic conveying as a single fan.

Figure 8:
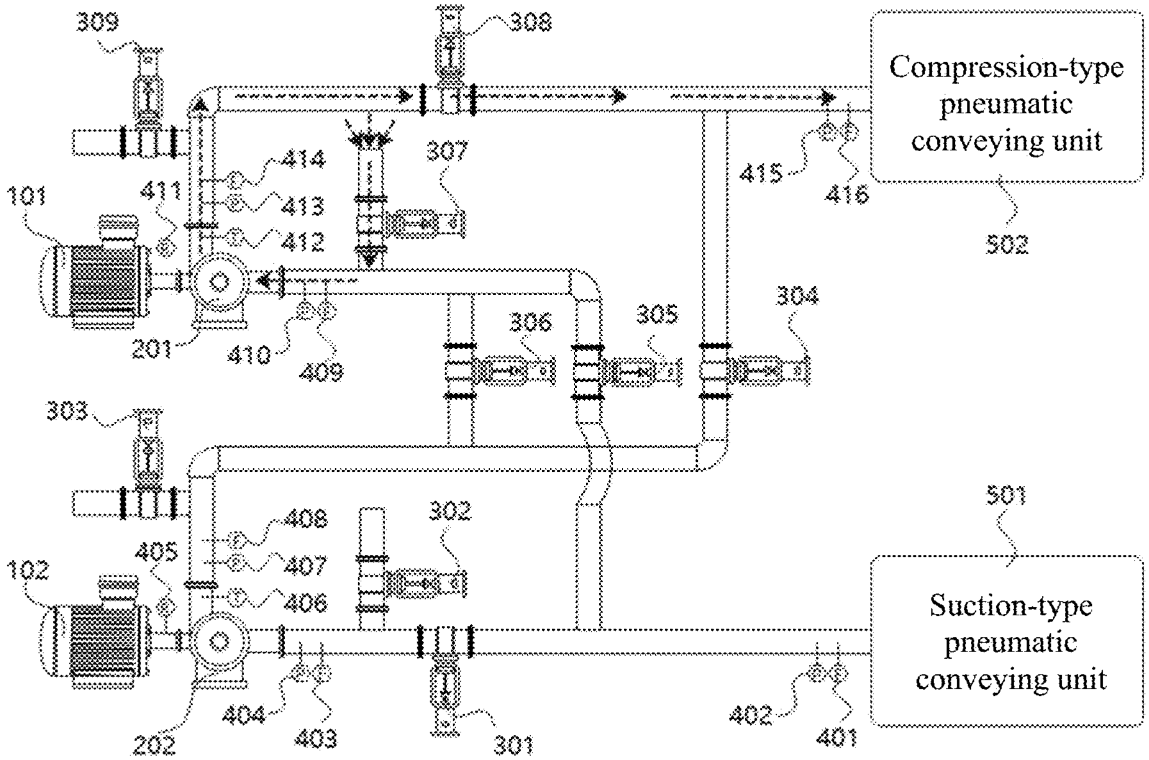
FIG. 8 is a schematic diagram of positive pressure compression-type pneumatic conveying with the first fan as a single fan according to some embodiments of the present disclosure.

The principles of such operation mode are shown in FIG. 8. During operation, first of all, the seventh control valve 307 and the eighth control valve 308 are turned on, and the first control valve 301, the second control valve 302, the third control valve 303, the fourth control valve 304, the fifth control valve 305, the sixth control valve 306 and the ninth control valve 309 are maintained in an OFF state. Then, the first power system 101 is turned on, and operation parameters of the first power system 101 are adjusted to make the first fan 201 reach a specified speed. The pressure data measured by the sixth pressure sensor 415 and the flow rate data measured by the sixth flow sensor 416 are read and compared with the required data, and the operation parameters of the first power system 101 are dynamically adjusted according to a difference. If the flow rate value measured by the sixth flow sensor 416 still does not satisfy the requirements at a maximum rotation speed of the first fan 201, it is switched to the eighth operation mode; if the pressure value measured by the sixth pressure sensor 415 at a maximum rotation speed of the first fan 201 still does not satisfy the requirements, it is switched to the seventh operation mode. Throughout the operation, the test data of the second temperature sensor 412, the fifth pressure sensor 413 and the fifth flow sensor 414 are monitored. If a limit value is exceeded, an alarm will be sent, and at the same time, the system will automatically enter into a protection program, and the power system and the control valves will be off sequentially.

In the sixth operation mode, the second fan 202 performs positive pressure compression-type pneumatic conveying as a single fan.

Figure 9:
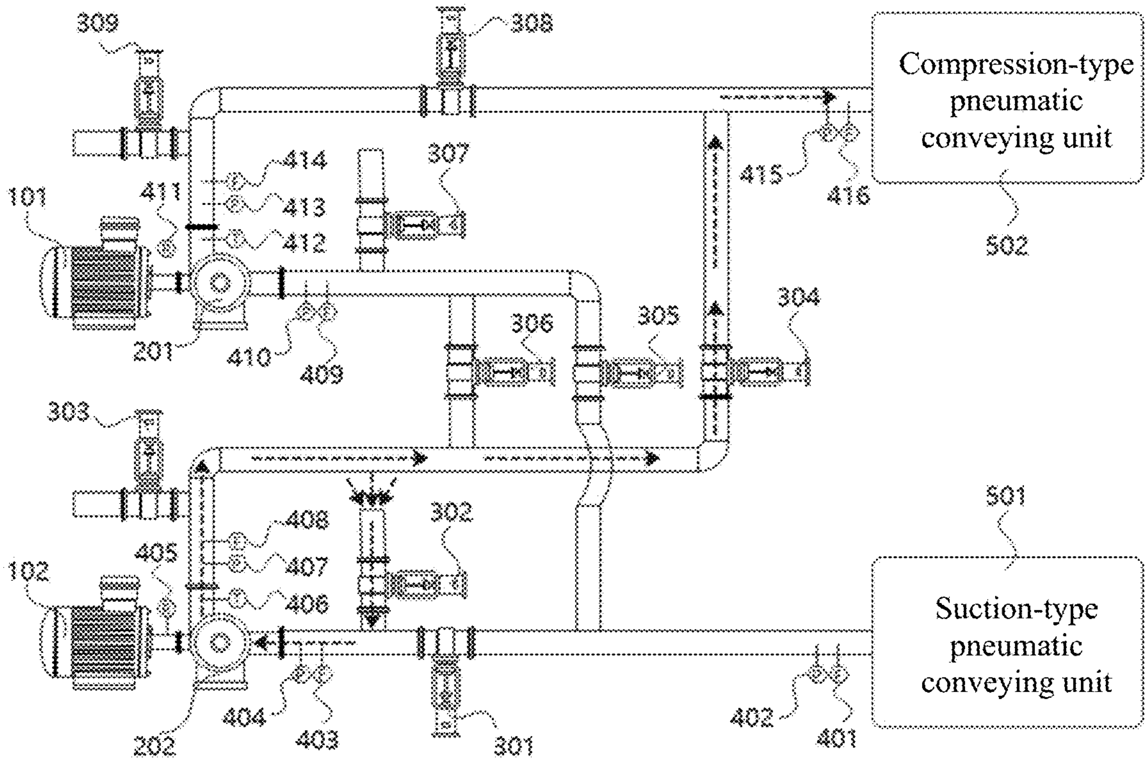
FIG. 9 is a schematic diagram of positive pressure compression-type pneumatic conveying with the second fan as a single fan according to some embodiments of the present disclosure.

The principles of such operation mode are shown in FIG. 9. During operation, first of all, the second control valve 302 and the fourth control valve 304 are turned on, and the first control valve 301, the third control valve 303, the fifth control valve 305, the sixth control valve 306, the seventh control valve 307, the eighth control valve 308 and the ninth control valve 309 are maintained in an OFF state. Then, the second power system 102 is turned on, and operation parameters of the second power system 102 are adjusted to make the second fan 202 reach a specified speed. The pressure data measured by the sixth pressure sensor 415 and the flow rate data measured by the sixth flow sensor 416 are read and compared with the required data, and the operation parameters of the second power system 102 are dynamically adjusted according to a difference. If the flow rate value measured by the sixth flow sensor 416 still does not satisfy the requirements at a maximum rotation speed of the second fan 202, it is switched to the eighth operation mode; if the pressure value measured by the sixth pressure sensor 415 at a maximum rotation speed of the second fan 202 still does not satisfy the requirements, it is switched to the seventh operation mode. Throughout the operation, the test data of the first temperature sensor 406, the third pressure sensor 407 and the third flow sensor 408 are monitored. If a limit value is exceeded, an alarm will be sent, and at the same time, the system will automatically enter into a protection program, and the power system and the control valves will be off sequentially. The fifth operation mode cooperates with the sixth operation mode, so that it is possible for two fans to take turns in operation/maintenance during positive pressure compression-type pneumatic conveying with a single fan and prolong the service life of the fan.

In the seventh operation mode, the first fan 201 and the second fan 202 are connected in series and perform positive pressure compression-type pneumatic conveying.

Figure 10:
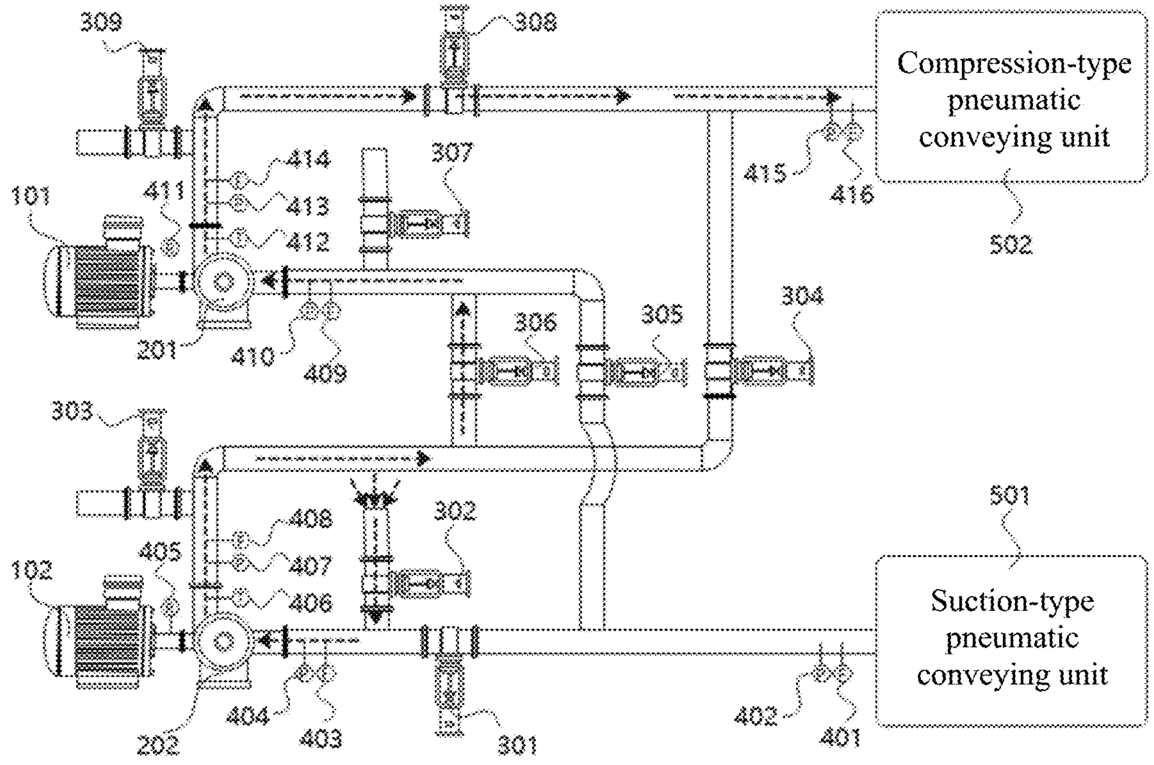
FIG. 10 is a schematic diagram of positive pressure compression-type pneumatic conveying with the first and second fans connected in series according to some embodiments of the present disclosure.

The principles of such operation mode are shown in FIG. 10. During operation, first of all, the second control valve 302, the sixth control valve 306 and the eighth control valve 308 are turned on, and the first control valve 301, the third control valve 303, the fourth control valve 304, the fifth control valve 305, the seventh control valve 307 and the ninth control valve 309 are maintained in an OFF state. Then, the first power system 101 and the second power system 102 are turned on, and operation parameters of the first power system 101 and the second power system 102 are adjusted to make the first fan 201 and the second fan 202 reach a specified speed. The pressure data measured by the sixth pressure sensor 415 and the flow rate data measured by the sixth flow sensor 416 are read and compared with the required data, and the operation parameters of the first power system 101 and the second power system 102 are synchronously dynamically adjusted according to a difference. Throughout the operation, the test data of the first temperature sensor 406, the third pressure sensor 407, the third flow sensor 408, the second temperature sensor 412, the fifth pressure sensor 413 and the fifth flow sensor 414 are monitored. If a limit value is exceeded, an alarm will be sent, and at the same time, the system will automatically enter into a protection program, and the power system and the control valves will be off sequentially. Compared with the first operation mode and the second operation mode, such operation mode is able to provide a greater air pressure for the compression-type pneumatic conveying unit 502 and realize pneumatic conveying at a farther distance.

In the eighth operation mode, the first fan 201 and the second fan 202 are connected in parallel and perform positive pressure compression-type pneumatic conveying.

Figure 11:
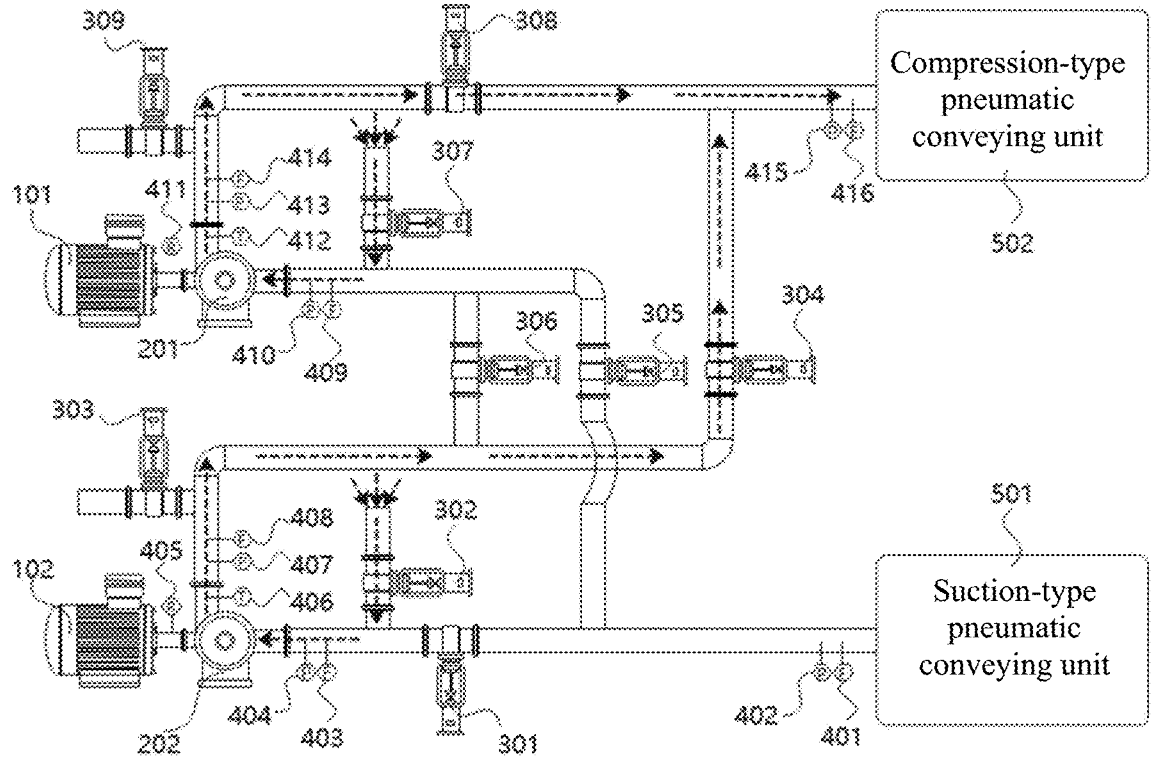
FIG. 11 is a schematic diagram of positive pressure compression-type pneumatic conveying with the first and second fans connected in parallel according to some embodiments of the present disclosure.

The principles of such operation mode are shown in FIG. 11. During operation, first of all, the second control valve 302, the fourth control valve 304, the seventh control valve 307 and the eighth control valve 308 are turned on, and the first control valve 301, the third control valve 303, the fifth control valve 305, the sixth control valve 306 and the ninth control valve 309 are maintained in an OFF state. Then, the first power system 101 and the second power system 102 are turned on, and operation parameters of the first power system 101 and the second power system 102 are adjusted to make the first fan 201 and the second fan 202 reach a specified speed. The pressure data measured by the sixth pressure sensor 415 and the flow rate data measured by the sixth flow sensor 416 are read and compared with the required data, and the operation parameters of the first power system 101 and the second power system 102 are synchronously dynamically adjusted according to a difference. Throughout the operation, the test data of the first temperature sensor 406, the third pressure sensor 407, the third flow sensor 408, the second temperature sensor 412, the fifth pressure sensor 413 and the fifth flow sensor 414 are monitored. If a limit value is exceeded, an alarm will be sent, and at the same time, the system will automatically enter into a protection program, and the power system and the control valves will be off sequentially. Compared with the first operation mode and the second operation mode, such operation mode is able to provide a greater pneumatic flow rate for the compression-type pneumatic conveying unit 502 and improve the pneumatic conveying efficiency.

In some embodiments of the present disclosure, the present disclosure further seeks protection for a control system comprising a memory and a processor. Wherein: the memory may be a magnetic disk, a flash memory, or any other non-volatile storage medium. The memory is configured to store instructions in the above-described embodiments. The processor which is coupled to the memory, may be implemented as one or more integrated circuits, such as a microprocessor or a microcontroller. The processor is configured to execute instructions stored in the memory.

In some embodiments, the processor is coupled to the memory via a bus. The control system may also be connected to an external storage system via a storage interface for calling external data, and may also be connected to a network or another computer system via a network interface. Detailed introduction will not be repeated here.

In other embodiments, a computer readable storage medium has computer program instructions stored thereon that, when executed by a processor, implement the steps of the method in the above-described embodiments. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (comprising but not limited to disk memory, CD-ROM, optical memory, and the like) containing computer usable program codes therein.

The above descriptions are only preferred embodiments of the present disclosure. It should be noted that: those skilled in the art may also make several improvements and refinements without departing from the principles of the present disclosure, which modifications and refinements are also considered to be within the protection scope of the present disclosure.

The invention claimed is:

1. A pneumatic conveying system, comprising: a power unit, a fan unit, a valve unit, a pneumatic conveying unit and a pipeline arrangement network, the power unit comprising a first power system and a second power system, configured to provide power to the fan unit;

the fan unit comprising a first fan and a second fan;

the valve unit comprising a first control valve, a second control valve, a third control valve, a fourth control valve, a fifth control valve, a sixth control valve, a seventh control valve, an eighth control valve and a ninth control valve;

the pneumatic conveying unit comprising a suction-type pneumatic conveying unit and a compression-type pneumatic conveying unit; and the pipeline arrangement network comprising a first pipeline, a first bypass pipeline, a second pipeline, a second bypass pipeline, a third pipeline, a third bypass pipeline, a fourth pipeline, a fourth bypass pipeline and a first connection pipeline, wherein:

a return air inlet of the first fan is connected with the first pipeline, and the first pipeline is connected with the fifth control valve; the first pipeline at a front end of the fifth control valve is connected with the first bypass pipeline, the first bypass pipeline is connected with the seventh control valve; an air outlet of the first fan is connected with the second pipeline, and an extremity of the second pipeline is connected with the compression-type pneumatic conveying unit; the second pipeline is connected with the eighth control valve, the second pipeline at a front end of the eighth control valve is connected with the second bypass pipeline, and the second bypass pipeline is connected with the ninth control valve;

a return air inlet of the second fan is connected with the third pipeline, and an extremity of the third pipeline is connected with the suction-type pneumatic conveying unit; the third pipeline is connected with the first control valve, the third pipeline at a front end of the first control valve is connected with the third bypass pipeline, and the third bypass pipeline is connected with the second control valve; an air outlet of the second fan is connected with the fourth pipeline, the fourth pipeline is connected with the fourth control valve, the fourth pipeline at a front end of the fourth control valve is connected with the fourth bypass pipeline, and the fourth bypass pipeline is connected with a third control valve;

an extremity of the first pipeline is connected with the third pipeline at a rear end of the first control valve to be in conduction with the suction-type pneumatic conveying unit; an extremity of the fourth pipeline is connected with the second pipeline at a rear end of the eighth control valve to be connected with the compression-type pneumatic conveying unit; and the first pipeline between a front end of the fifth control valve and the first bypass pipeline is connected with one end of the first connection pipeline; the fourth pipeline between a front end of the fourth control valve and the fourth bypass pipeline is connected with the other end of the first connection pipeline, and the first connection pipeline is provided with a sixth control valve.

2. The pneumatic conveying system according to claim 1, further comprising a sensor unit which comprises a first flow sensor, a first pressure sensor, a second flow sensor, a second pressure sensor, a first rotation speed sensor, a first temperature sensor, a third pressure sensor and a third flow sensor, wherein:

the third pipeline at a front end of the suction-type pneumatic conveying unit is provided with the first flow sensor and the first pressure sensor; the third pipeline at a front end of the return air inlet of the second fan are provided with the second flow sensor and the second pressure sensor; the second power system is provided with the first speed sensor; the second fan is provided with the first temperature sensor, and the fourth pipeline at a front end of the air outlet of the second fan is provided with the third pressure sensor and the third flow sensor.

3. The pneumatic conveying system according to claim 2, wherein the sensor unit further comprises a fourth flow sensor, a fourth pressure sensor, a second rotation speed sensor, a second temperature sensor, a fifth pressure sensor, a fifth flow sensor, a sixth pressure sensor and a sixth flow sensor, wherein:

the first pipeline at a front end of the return air inlet of the first fan are provided with the fourth flow sensor and the fourth pressure sensor; the first power system is provided with the second speed sensor; the first fan is provided with the second temperature sensor; the second pipeline at a front end of the air outlet of the first fan are provided with the fifth pressure sensor and the fifth flow sensor; the second pipeline at a front end of the compression-type pneumatic conveying unit are provided with the sixth pressure sensor and the sixth flow sensor.

4. The pneumatic conveying system according to claim 2, further comprising a control system which automatically operates or manually operates a control method of the pneumatic conveying system according to the data measured by the sensor unit.

5. A control method of a pneumatic conveying system, comprising:

causing the pneumatic conveying system to enter into a first operation mode, to make a first fan perform negative pressure suction-type pneumatic conveying as a single fan; monitoring test data of a fourth flow sensor, a fourth pressure sensor and a second temperature sensor throughout the operation process; sending an alarm in a case where the test data of at least one of the fourth flow sensor, the fourth pressure sensor or the second temperature sensor exceeds a corresponding limit value, and automatically entering into a system protection program at the same time, and turning off a power system and a control valve sequentially;

switching to a fourth operation mode to make the first fan and a second fan connected in parallel perform negative pressure suction-type pneumatic conveying in a case where a flow rate value measured by a first flow sensor still does not satisfy the requirements at a maximum rotation speed of the first fan; and switching to a third operation mode to make the first fan and the second fan connected in series perform negative pressure suction-type pneumatic conveying in a case where a pressure value measured by a first pressure sensor still does not satisfy the requirements at a maximum rotation speed of the first fan.

6. The control method according to claim 5, further comprising:

causing the pneumatic conveying system to enter into a second operation mode to make the second fan perform negative pressure suction-type pneumatic conveying as a single fan; monitoring test data of a second flow sensor, a second pressure sensor and a first temperature sensor throughout the operation process; sending an alarm, automatically entering into the system protection program at the same time, and turning off the power system and the control valve sequentially in a case where the test data of at least one of the second flow sensor, the second pressure sensor or the first temperature sensor exceeds a corresponding limit value;

switching to the fourth operation mode to make the first fan and the second fan connected in parallel perform negative pressure suction-type pneumatic conveying in a case where the flow rate value measured by the first flow sensor still does not satisfy the requirements at a maximum rotation speed of the second fan; and switching to the third operation mode to make the first fan and the second fan connected in series perform negative pressure suction-type pneumatic conveying in a case where the pressure value measured by the first pressure sensor still does not satisfy the requirements at a maximum rotation speed of the second fan.

7. The control method according to claim 5, wherein the first operation mode comprises:

turning on a fifth control valve and a ninth control valve, and maintaining a first control valve, a second control valve, a third control valve, a fourth control valve, a sixth control valve, a seventh control valve and a eighth control valve in an OFF state; starting a first power system and adjusting operation parameters of the first power system to make the first fan reach a specified rotation speed; reading the flow rate value measured by the first flow sensor and the pressure value measured by the first pressure sensor to be compared with a required data, and dynamically adjusting the operation parameters of the first power system according to a difference during operation.

8. The control method according to claim 6, wherein the second operation mode comprises:

turning on a first control valve and a third control valve, and maintaining a second control valve, a fourth control valve, a fifth control valve, a sixth control valve, a seventh control valve, an eighth control valve and a ninth control valve in an OFF state; starting a second power system and adjusting operation parameters of the second power system to make the second fan reach a specified rotation speed; reading the flow rate value measured by the first flow sensor and the pressure value measured by the first pressure sensor to be compared with a required data, and dynamically adjusting the operation parameters of the second power system according to a difference during operation.

9. The control method according to claim 7, wherein the third operation mode comprises:

turning on the first control valve, the sixth control valve and the ninth control valve, and maintaining the second control valve, the third control valve, the fourth control valve, the fifth control valve, the seventh control valve and the eighth control valve in the OFF state; starting the first power system and a second power system and adjusting operation parameters of the first power system and the second power system to make the first fan and the second fan reach a specified rotation speed; reading the flow rate value measured by the first flow sensor and the pressure value measured by the first pressure sensor to be compared with the required data, and synchronously and dynamically adjusting the operation parameters of the first power system and the second power system according to a difference during operation; and monitoring test data of a second flow sensor, a second pressure sensor, a first temperature sensor, the fourth flow sensor, the fourth pressure sensor and the second temperature sensor throughout the operation process, and sending the alarm, automatically entering into the system protection program at the same time, and turning off the power system and the control valve sequentially in a case where the test data of at least one of the second flow sensor, the second pressure sensor, the first temperature sensor, the fourth flow sensor, the fourth pressure sensor or the second temperature sensor exceeds a corresponding limit value.

10. The control method according to claim 9, wherein the fourth operation mode comprises:

turning on the first control valve, the third control valve, the fifth control valve and the ninth control valve, and maintaining the second control valve, the fourth control valve, the sixth control valve, the seventh control valve and the eighth control valve in the OFF state; starting the first power system and the second power system, and adjusting the operation parameters of the first power system and the second power system to make the first fan and the second fan reach a specified rotation speed; reading the flow rate value measured by the first flow sensor and the pressure value measured by the first pressure sensor to be compared with the required data, and synchronously and dynamically adjusting the operation parameters of the first power system and the second power system according to a difference during operation; and monitoring the test data of the second flow sensor, the second pressure sensor, the first temperature sensor, the fourth flow sensor, the fourth pressure sensor and the second temperature sensor throughout the operation process, and sending the alarm, automatically entering into the system protection program at the same time, and turning off the power system and the control valve sequentially in a case where the test data of at least one of the second flow sensor, the second pressure sensor, the first temperature sensor, the fourth flow sensor, the fourth pressure sensor or the second temperature sensor exceeds a corresponding limit value.

11. A control method of a pneumatic conveying system, comprising:

causing the pneumatic conveying system to enter into a fifth operation mode to make a first fan perform positive pressure compression-type pneumatic conveying as a single fan; monitoring a test data of a second temperature sensor, a fifth pressure sensor and a fifth flow sensor throughout an operation process, and sending an alarm, automatically entering into a system protection program at the same time, and turning off a power system and a control valve sequentially in a case where the test data of at least one of the second temperature sensor, the fifth pressure sensor or the fifth flow sensor exceeds a corresponding limit value;

switching to an eighth operation mode to make the first fan and a second fan connected in parallel perform positive pressure compression-type pneumatic conveying in a case where a flow rate value measured by a sixth flow sensor still does not satisfy the requirements at a maximum rotation speed of the first fan; and switching to a seventh operation mode to make the first fan and the second fan connected in series perform positive pressure compression-type pneumatic conveying in a case where a pressure value measured by a sixth pressure sensor still does not satisfy the requirements at a maximum rotation speed of the first fan.

12. The control method according to claim 11, further comprising:

causing the pneumatic conveying system to enter into a sixth operation mode to make the second fan perform positive pressure suction-type pneumatic conveying as a single fan; monitoring test data of a first temperature sensor, a third pressure sensor and a third flow sensor throughout the operation process; sending an alarm, automatically entering into a system protection program at the same time, and turning off a power system and a control valve sequentially in a case where the test data of at least one of the first temperature sensor, the third pressure sensor or the third flow sensor exceeds a corresponding limit value;

switching to the eighth operation mode to make the first fan and the second fan connected in parallel perform positive pressure compression-type pneumatic conveying in a case where the flow rate value measured by the sixth flow sensor still does not satisfy the requirements at a maximum rotation speed of the second fan; and switching to the seventh operation mode to make the first fan and the second fan connected in series perform positive pressure compression-type pneumatic conveying in a case where the pressure value measured by the sixth pressure sensor still does not satisfy the requirements at a maximum rotation speed of the second fan.

13. The control method according to claim 11, wherein the fifth operation mode comprises:

turning on a seventh control valve and an eighth control valve, and maintaining a first control valve, a second control valve, a third control valve, a fourth control valve, a fifth control valve, a sixth control valve and a ninth control valve in an OFF state; starting a first power system and adjusting operation parameters of the first power system to make the first fan reach a specified rotation speed; reading the pressure value measured by the sixth pressure sensor and the flow rate value measured by the sixth flow sensor to be compared with the required data, and dynamically adjusting the operation parameters of the first power system according to a difference during operation.

14. The control method according to claim 13, wherein the sixth operation mode comprises:

turning on a second control valve and a fourth control valve, and maintaining the first control valve, the third control valve, the fifth control valve, the sixth control valve, the seventh control valve, the eighth control valve and the ninth control valve in the OFF state; starting a second power system and adjusting operation parameters of the second power system to make the second fan reach a specified rotation speed; reading the pressure value measured by the sixth pressure sensor and the flow rate value measured by the sixth flow sensor to be compared with the required data, and dynamically adjusting the operation parameters of the second power system according to a difference during operation.

15. The control method according to claim 11, wherein the seventh operation mode comprises:

turning on a second control valve, a sixth control valve and an eighth control valve, and maintaining a first control valve, a third control valve, a fourth control valve, a fifth control valve, a seventh control valve and a ninth control valve in an OFF state; starting a first power system and a second power system, and adjust operation parameters of the first power system and the second power system to make the first fan and the second fan reach a specified rotation speed; reading the pressure value measured by the sixth pressure sensor and the flow rate value measured by the sixth flow sensor to be compared with the required data, and synchronously and dynamically adjusting the operation parameters of the first power system and the second power system according to a difference during operation; and monitoring test data of a first temperature sensor, a third pressure sensor, a third flow sensor, the second temperature sensor, the fifth pressure sensor and the fifth flow sensor throughout the operation process, and sending an alarm, automatically entering into a system protection program at the same time, and turning off a power system and a control valve sequentially in a case where the test data of at least one of the first temperature sensor, the third pressure sensor, the third flow sensor, the second temperature sensor, the fifth pressure sensor or the fifth flow sensor exceeds a corresponding limit value.

16. The control method according to claim 15, wherein the eighth operation mode comprises:

turning on the second control valve, the fourth control valve, the seventh control valve and the eighth control valve, and maintaining the first control valve, the third control valve, the fifth control valve, the sixth control valve and the ninth control valve in the OFF state; starting the first power system and the second power system, and adjusting operation parameters of the first power system and the second power system to make the first fan and the second fan reach the specified rotation speed; reading the pressure value measured by the sixth pressure sensor and the flow rate value measured by the sixth flow sensor to be compared with the required data, and synchronously and dynamically adjusting the operation parameters of the first power system and the second power system according to a difference during operation; and monitoring the test data of the first temperature sensor, the third pressure sensor, the third flow sensor, the second temperature sensor, the fifth pressure sensor and the fifth flow sensor throughout the operation process, and sending the alarm, automatically entering into the system protection program at the same time, and turning off the power system and the control valve sequentially in a case where the test data of at least one of the first temperature sensor, the third pressure sensor, the third flow sensor, the second temperature sensor, the fifth pressure sensor or the fifth flow sensor exceeds a corresponding limit value.

* * * * *